(12) United States Patent
Jerdev

(10) Patent No.: US 7,822,293 B2
(45) Date of Patent: Oct. 26, 2010

(54) IMAGING SYSTEMS AND METHOD FOR GENERATING VIDEO DATA USING EDGE-AWARE INTERPOLATION WITH SOFT-THRESHOLDING

(75) Inventor: Dmitri Jerdev, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 1013 days.

(21) Appl. No.: 11/601,390

(22) Filed: Nov. 17, 2006

(65) Prior Publication Data

US 2008/0118185 A1    May 22, 2008

(51) Int. Cl.
*G06K 9/32* (2006.01)
(52) U.S. Cl. ............... 382/300; 348/459; 348/223.1
(58) Field of Classification Search ............. 382/300
See application file for complete search history.

(56) References Cited

U.S. PATENT DOCUMENTS

| | | | |
|---|---|---|---|
| 5,428,399 A * | 6/1995 | Robinson et al. ......... 348/459 |
| 6,229,578 B1 * | 5/2001 | Acharya et al. .......... 348/607 |
| 6,317,522 B1 * | 11/2001 | Rackett ................. 382/268 |
| 6,507,364 B1 * | 1/2003 | Bishay et al. ............ 348/242 |
| 6,628,330 B1 * | 9/2003 | Lin ..................... 348/252 |
| 7,053,944 B1 * | 5/2006 | Acharya et al. .......... 348/273 |
| 7,333,678 B1 * | 2/2008 | Huang et al. ............ 382/300 |
| 7,460,734 B2 * | 12/2008 | Chao ................... 382/300 |
| 7,486,844 B2 * | 2/2009 | Chang et al. ............ 382/300 |
| 2003/0184659 A1 * | 10/2003 | Skow ................. 348/223.1 |
| 2005/0078884 A1 * | 4/2005 | Yi ..................... 382/300 |
| 2005/0141785 A1 * | 6/2005 | Chao .................... 382/300 |
| 2005/0169531 A1 * | 8/2005 | Fan ..................... 382/199 |

\* cited by examiner

*Primary Examiner*—Brian Q Le
*Assistant Examiner*—Tsung-Yin Tsai
(74) *Attorney, Agent, or Firm*—David C. Kellogg

(57) ABSTRACT

Embodiments of an imaging system and method for generating video data with edge-aware interpolation are generally described herein. Other embodiments may be described and claimed. In some embodiments, an edge-aware demosaicing process is performed on image sensor data to generate pixel-edge data, and video output data may be generated by adding the pixel-averaged data to difference data weighted by a correction factor. The difference data represents a difference between pixel-averaged data and the pixel-edge data. The correction factor may be proportional to an amount of edge content in the image sensor data.

3 Claims, 4 Drawing Sheets

IMAGING SYSTEM $$203A \begin{cases} RED45 = (2*(p35 + p55) + p33 + p53 + p37 + p57)/8; \\ GREEN45 = (4*p45 + p35 + p46 + p55 + p34)/8; \\ BLUE45 = (2*(p44 + p46) + p24 + p26 + p64 + p66)/8; \end{cases}$$

$$203B \begin{cases} RED45 = (p56 + p54 + p36 + p34)/4; \\ GREEN45 = (p44 + p35 + p46 + p55)/4; \\ BLUE45 = (4*p45 + p43 + p47 + p65 + p25)/8; \end{cases}$$

IMAGING SYSTEMS AND METHOD FOR GENERATING VIDEO DATA USING EDGE-AWARE INTERPOLATION WITH SOFT-THRESHOLDING

TECHNICAL FIELD

Embodiments of the present invention pertain to image processing including the generation of video data, such as red-green-blue (RGB) data, from image sensor data, such as Bayer data in digital cameras and wireless communication devices.

BACKGROUND

Many conventional imaging systems use image sensors having an array of elements arranged in a mosaic form. These sensor elements generate image sensor data with information about a single color component (e.g., red, green or blue) for each element. This may be referred to as Bayer data. An output digital image, on the other hand, generally requires information on all three color components (e.g., red, green and blue) for each pixel. This may be referred to as RGB video data. Conventional imaging systems use various interpolation processes to demosaic Bayer data and generate RGB video data. One problem with some of these conventional imaging systems is the generation of noticeable artifacts in the digital image due to the interpolation processes. Another problem with some of these conventional imaging systems is that aperture correction is performed separate from the interpolation processes, sometimes requiring a separate aperture correction module.

Thus, there are general needs for imaging systems and methods that interpolate image sensor data while reducing artifacts. Thus, there are also needs for imaging systems and methods that interpolate image sensor data without a separate aperture correction.

DETAILED DESCRIPTION

The following description and the drawings sufficiently illustrate specific embodiments of the invention to enable those skilled in the art to practice them. Other embodiments may incorporate structural, logical, electrical, process, and other changes. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without limiting the scope of this application to any single invention or inventive concept if more than one is in fact disclosed.

Figure 1:
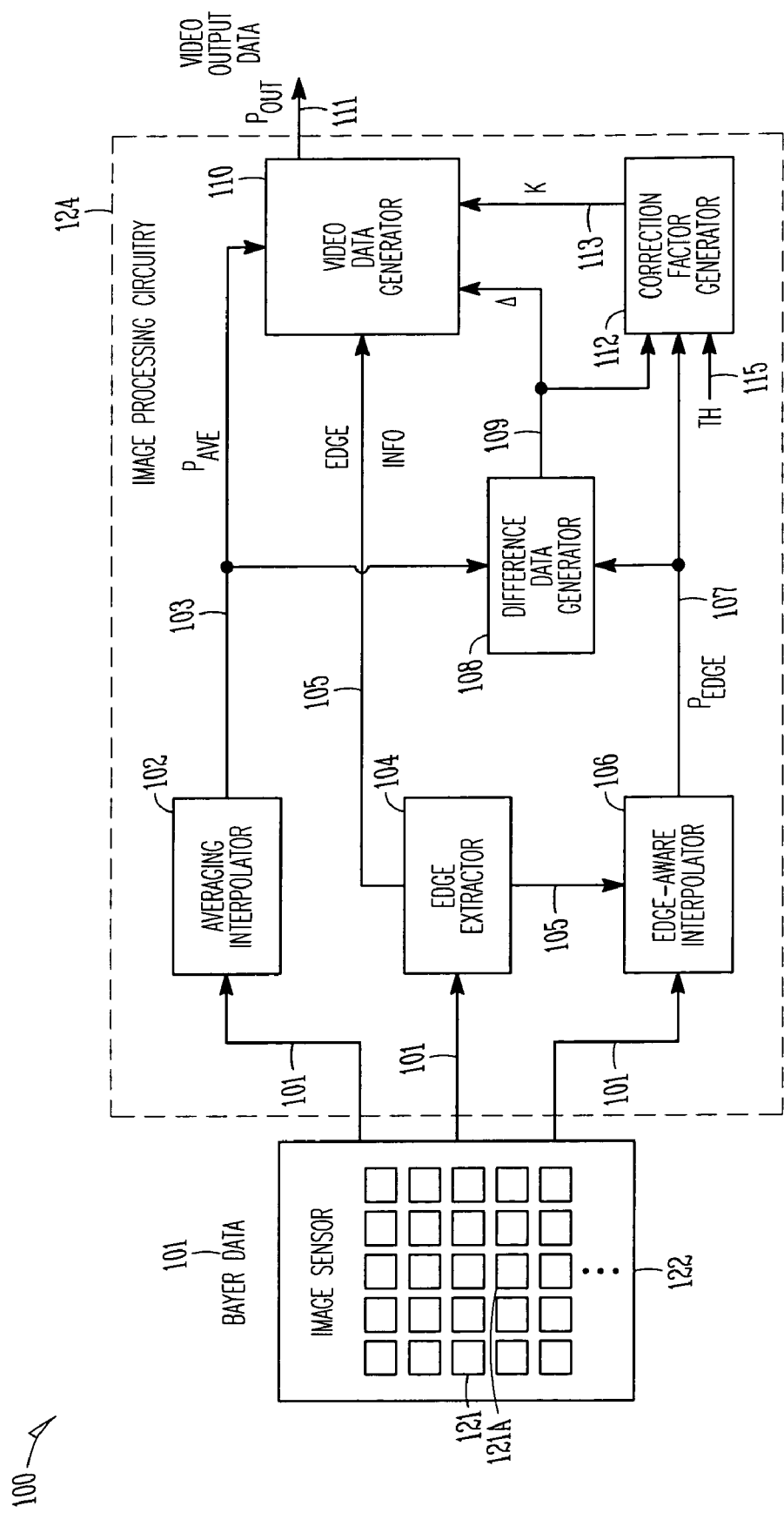
FIG. 1 is a functional block diagram of an imaging system in accordance with embodiments of the present invention.

FIG. 1 is a functional block diagram of an imaging system in accordance with embodiments of the present invention. Imaging system 100 comprises image sensor 122, which generates image sensor data 101 from a plurality of pixels 121, and image processing circuitry 124, which interpolates image sensor data 101 to generate video output data 111.

Image processing circuitry 124 may include averaging interpolator 102 to perform a pixel-averaging demosaicing process on image sensor data 101 to generate pixel-averaged data 103. Image processing circuitry 124 may also include edge extractor 104 to perform an edge-extraction interpolation process to generate edge magnitude information 105 from image sensor data 101. Image processing circuitry 124 may also include edge-aware interpolator 106 to perform an edge-aware demosaicing process on image sensor data 101 to generate pixel-edge data 107. Image processing circuitry 124 may also include difference data generator 108 to generate difference data 109 representing a difference between pixel-averaged data 103 and pixel-edge data 107. Image processing circuitry 124 may also include video data generator 110 to generate video output data 111 for some or all of pixels 121 by adding pixel-averaged data 103 to pixel-edge data 107 weighted by correction factor 113. In these embodiments, correction factor 113 may be proportional to an amount of edge content in image sensor data 101. Edge content may refer to the number of pixels that are associated with an edge in an image.

Image sensor data 101 may comprise an intensity value for each of a plurality of pixels 121 of image sensor 122. Each intensity value may be associated with one color (i.e., red, green or blue). For each pixel, video output data 111 may have intensity values for all three colors (i.e., red, green and blue) associated therewith. In these embodiments, each pixel 121 of image sensor 122 may generate an intensity value for a single color. In some embodiments, image sensor data 101 comprises Bayer data, and video output data 111 comprises RGB intensity data, although the scope of these embodiments is not limited in this respect.

The following equations may be used by video data generator 110 to calculate difference data 109 and output data 111:

$$\Delta = P_{edge} - P_{ave}, \text{ and}$$

$$P_{out} = P_{ave} + k * \Delta.$$

In these equations, $\Delta$ represents difference data 109, $P_{edge}$ represents pixel-edge data 107, $P_{ave}$ represents pixel-averaged data 103, k represents correction factor 113, and $P_{out}$ represents output data 111. Difference data generator 108 may generate difference data 109 on a pixel-by-pixel basis, and video data generator 110 may generate video output data 111 for each pixel 121.

In some embodiments, $\Delta$ may be calculated separately for each channel as red, green and blue values. For example, $\Delta R$, $\Delta G$ and $\Delta B$ (i.e., red, green and blue difference data) may each be calculated from pixel-edge data 107 and pixel-averaged data 103. In these embodiments, $\Delta R$, $\Delta G$ and $\Delta B$ may be converted to a $\Delta Y$ value using an RGB to Y conversion expression and may be used calculate output data 111 when correction factor 113 ranges from zero up to and including one (i.e., $0 \leq k \leq 1$), although the scope of these embodiments is not limited in this respect. When correction factor 113 is greater than one (i.e., $k>1$), a single value of $\Delta Y$ may be used for all three channels, although the scope of these embodiments is not limited in this respect.

Edge-aware interpolator 106 generates pixel-edge data 107 with preserved edges. In these embodiments, an edge of an image may be defined by the abruptness in intensity and/or color change between a first region of pixels and a second region of pixels. The boundary between the two regions of pixels may be classified as edge pixels or pixels belonging to the edge.

Correction factor 113 for a current pixel (e.g., pixel 121A) may be proportional to difference data 109 when pixel-edge data 107 is between a high and a low threshold value. Difference data 109 may represent the amount of edge content (i.e., edge information) for the current pixel. In some embodiments, correction factor 113 may be linearly proportional to an amount of edge content in image sensor data 101 for a current pixel being processed (e.g., pixel 121A). In these embodiments, an increased value for correction factor 113 may provide for sharper edges and improved picture quality in video output data 111, although the scope of these embodiments is not limited in this respect.

Image processing circuitry 124 may include correction factor generator 112 to generate correction factor 113 on a pixel-by-pixel basis by comparing pixel-edge data 107 for a current pixel (i.e., pixel 121A) to high and low threshold values 115. In these embodiments, image processing circuitry 124 may generate a high value (e.g., 1) for correction factor 113 when pixel-edge data 107 for the current pixel is greater than or equal to the high threshold value, and may generate a low value (e.g., 0) for correction factor 113 when pixel-edge data 107 for the current pixel is less than or equal to the low threshold value. In these embodiments, image processing circuitry 124 may generate a value between the high and low value for correction factor 113 when pixel-edge data 107 for the current pixel is between the high and low threshold values. In some embodiments, when pixel-edge data 107 for the current pixel is between the high and low threshold values, correction factor generator 112 may use a linear function to generate correction factor 113. In some embodiments, a linear interpolation using the following equation may be used to determine correction factor 113, although the scope of these embodiments is not limited in this respect:

$$k=|\Delta|-TH_L/(TH_H-TH_L).$$

In this equation, $TH_L$ represents the low threshold value, $TH_H$ represents the high threshold value, k represents correction factor 113, and $|\Delta|$ represents the absolute value of difference data 109. In these embodiments, correction factor 113 scales the image edge content as a function of the local edge content. In this way, interpolated pixel values on flat surfaces may be closer to the averaged value and thus may have less noise (e.g., for k closer to zero). Correction factor 113 may be greater for pixels on an edge. Accordingly, a smoother transition between the data generated by pixel-averaged data 103 and pixel-edge data 107 may help reduce and/or avoid any artifacts in the digital image that may result. This may be termed soft-thresholding.

Artifacts may be viewed as splashes of noise and are conventionally caused by changes in the interpolation processes used in the image. These embodiments may help compensate for the effects of green imbalance, which is caused by green pixels in odd and even lines having different sensitivities. While pixel averaging interpolation processes are generally immune to green imbalance, edge-aware interpolation processes may be adversely affected by green imbalance, which may be manifested by the presence of artifacts, such as a slight checker-board pattern.

Correction factor 113 may be great enough (i.e., k>1) to allow the edge content of a pixel to be boosted to enhance the image and produce an effect similar to aperture correction. In other words, the edge content for a particular pixel may emphasize the transition or edge to which the pixel belongs to. In these embodiments, the aperture correction resulting from increasing the correction factor 113 may at least in part compensate for the properties of a camera lens aperture to deblurr or to sharpen the image, although the scope of these embodiments is not limited in this respect.

The pixel-averaging demosaicing process performed by averaging interpolator 102 may generate a red intensity value, a green intensity value and a blue intensity value for a current pixel (i.e., pixel 121A) by weighting and combining image sensor data 101 for nearby pixels. The red intensity value, the green intensity value and the blue intensity value may comprise pixel-averaged data 103 for the current pixel.

The edge-aware demosaicing process performed by edge-aware interpolator 106 may generate pixel-edge data 107 based on a gradient between pixels to detect edges. In some embodiments, the edge-aware demosaicing process may define gradients in horizontal and vertical directions and may compare the gradients to a threshold. The threshold may be adaptively selected based on the image or based on the neighborhood, although the scope of these embodiments is not limited in this respect. In some embodiments, green pixels may be interpolated differently from red and blue pixels. The gradients may be used to identify intensity changes and define edges.

Edge-aware interpolator 106 may generate pixel-edge data 107 using the edge magnitude information 105 and video data generator 110 may generate video output data 111 using the edge magnitude information 105. In these embodiments, edge extractor 104 may generate edge magnitude information 105 based on a difference between nearby green pixels of image sensor 122 and a current pixel (e.g., pixel 121A), although the scope of these embodiments is not limited in this respect. The maximum difference between the nearby green pixels in a digital kernel may be used as the edge magnitude for the current pixel, although the scope of these embodiments is not limited in this respect. A digital kernel may comprise a group of pixels that include a central pixel and one or more layers of pixels surrounding the central pixel. The one or more layers of pixels surrounding the central pixel may be referred to as nearby or neighboring pixels. In some embodiments, video output data 111 may be further processed (by circuitry not separately illustrated) before being stored, displayed or transmitted. This is discussed in more detail below.

In some embodiments, edge magnitude information 105 may be used by edge-aware interpolator 106 to determine a direction to interpolate (e.g., whether to interpolate along the edge or across an edge identified by edge magnitude information 105). In some embodiments, edge magnitude information 105 may be used by video data generator 110 to determine how much of difference data 109 to use in the calculation of video output data 111.

Although imaging system 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. The functional elements of imaging system 100 may refer to one or more processes operating on one or more processing elements.

Figure 2A:
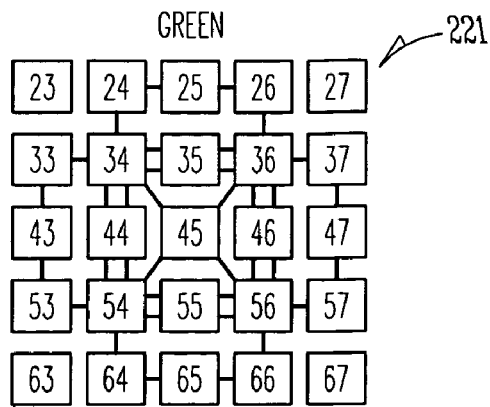
FIGS. 2A and 2B illustrate examples of pixel averaging interpolation processes in accordance with embodiments of the present invention.
Figure 2B:
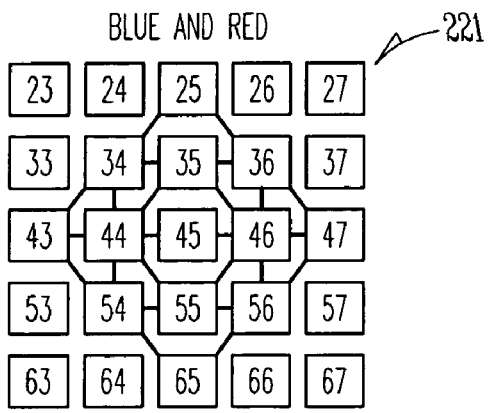

FIGS. 2A and 2B illustrate examples of pixel averaging interpolation processes in accordance with embodiments of the present invention. FIG. 2A illustrates an example of a pixel averaging interpolation process that may be performed by averaging interpolator 102 (FIG. 1) for a kernel with a green central pixel. FIG. 2B illustrates an example of a pixel averaging interpolation process that may be performed by averaging interpolator 102 (FIG. 1) for kernels with blue and red central pixels. Other pixel averaging interpolation and demosaicing processes may also be used. In FIGS. 2A and 2B, pixels 221 may correspond to pixels 121 (FIG. 1). Pixel-averaged data 203A may correspond to pixel-averaged data 103 (FIG. 1) for green pixels of image sensor 122 (FIG. 1), and pixel-averaged data 203B may correspond to pixel-averaged data 103 (FIG. 1) for blue and red pixels of image sensor 122 (FIG. 1), although the scope of these embodiments is not limited in this respect. The values inside pixels 221 are examples of pixel numbers of an image sensor and correspond to the numbers of the pixels used in pixel-averaged data 203A and 203B. For example, the designation p35 in pixel-averaged data 203A refers to the intensity value for pixel 35 of pixels 221.

Figure 3:
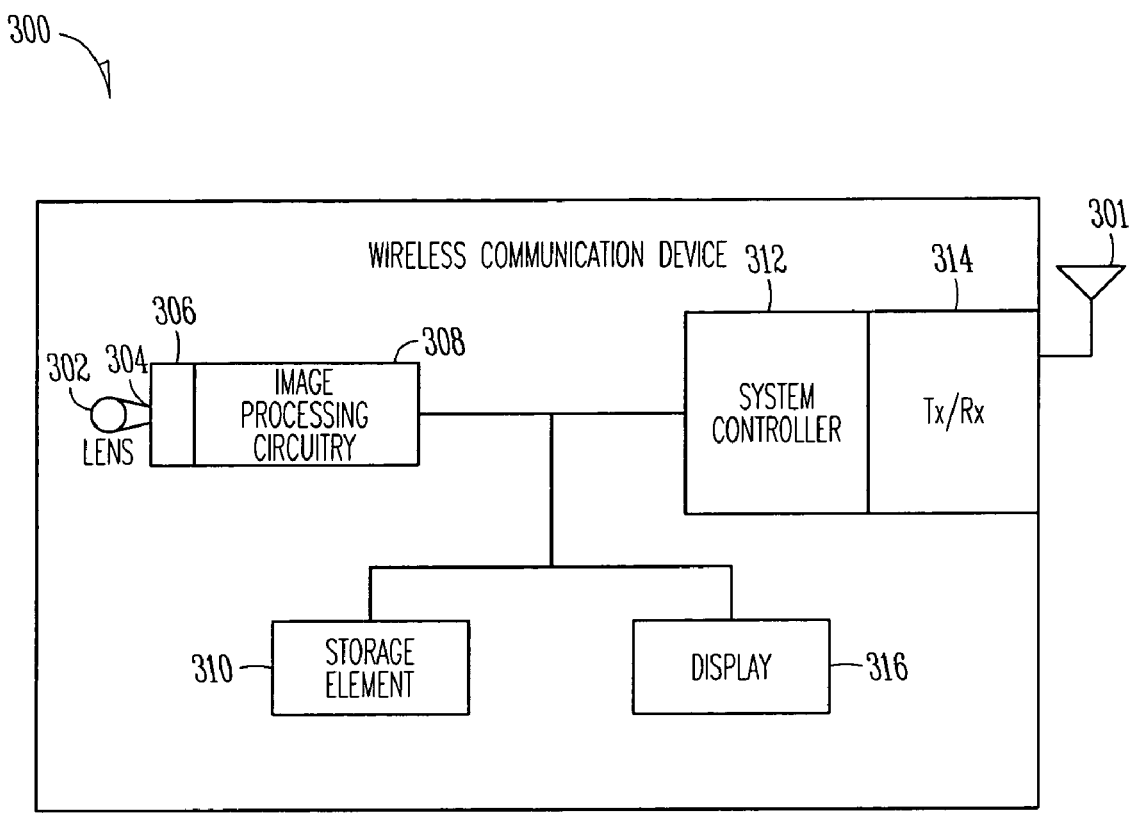
FIG. 3 is a functional diagram of a wireless communication device in accordance with embodiments of the present invention.

FIG. 3 is a functional diagram of a wireless communication device in accordance with embodiments of the present invention. Wireless communication device 300 may include lens 302, aperture 304, image sensor 306, image processing circuitry 308, storage element 310, system controller 312, transceiver (Tx/Rx) 314 and/or antenna 301. Image processing circuitry 308 may process images received through lens 302 using image sensor 306 to generate video output data, which may be stored in storage element 310, displayed on display 316, and/or transmitted by transceiver 314. Image processing circuitry 124 (FIG. 1) may be suitable for use as image processing circuitry 308, although the scope of these embodiments is not limited in this respect. Image sensor 122 (FIG. 1) may be suitable for use as image sensor 306. As discussed above, correction factor 113 (FIG. 1) may be increased to correct at least in part for the effects of aperture 304, although the scope of these embodiments is not limited in this respect.

In some embodiments, lens 302, aperture 304, image sensor 306, image processing circuitry 308, storage element 310, and/or system controller 312 may comprise a digital camera. In some embodiments, wireless communication device 300 may comprise a portable wireless communication device, such as a personal digital assistant (PDA), a laptop or portable computer with wireless communication capability, a web tablet, a wireless or cellular telephone, an instant messaging device, a television, a medical device, or other device that may receive and/or transmit information wirelessly.

Storage element 310 may comprise any type of digital storage medium or machine-readable medium, examples of which are discussed below. Antenna 301 may comprise one or more directional or omnidirectional antennas, including, for example, dipole antennas, monopole antennas, patch antennas, loop antennas, microstrip antennas or other types of antennas suitable for transmission of radio frequency (RF) signals.

Figure 4:
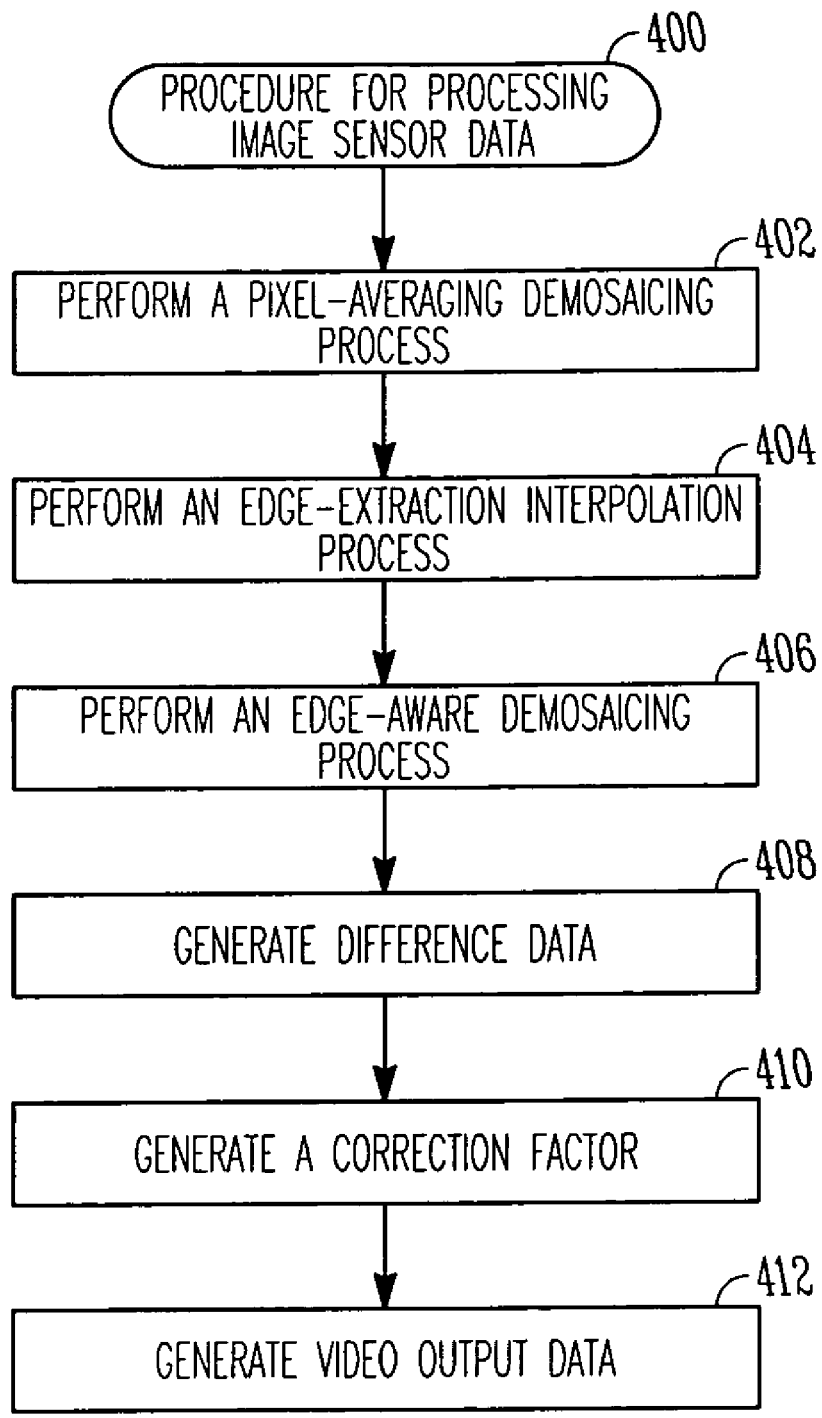
FIG. 4 is a flow chart of a procedure for processing image sensor data in accordance with embodiments of the present invention.

FIG. 4 is a flow chart of a procedure for processing image sensor data in accordance with embodiments of the present invention. Procedure 400 may be performed by image processing circuitry, such as image processing circuitry 124 (FIG. 1), although other processing circuitry may be used to perform procedure 400. Procedure 400 may be used to interpolate and demosaic image sensor data to generate video output data.

Operation 402 comprises performing a pixel averaging demosaicing process on image sensor data to generate the pixel-averaged data. In some embodiments, operation 402 may be performed by averaging interpolator 102 (FIG. 1).

Operation 404 comprises performing an edge-extraction interpolation process to generate edge-magnitude information from the image sensor data. In some embodiments, operation 404 may be performed by edge extractor 104 (FIG. 1).

Operation 406 comprises performing an edge-aware demosaicing process on the image sensor data to generate pixel-edge data. In some embodiments, the edge-aware demosaicing process may use the edge-magnitude information generated in operation 404. In some embodiments, operation 406 may be performed by edge-aware interpolator 106 (FIG. 1).

Operation 408 comprises generating difference data representing a difference between the pixel-averaged data generated in operation 402 and the pixel-edge data generated in operation 406. In some embodiments, operation 408 may be performed by difference data generator 108 (FIG. 1).

Operation 410 comprises generating a correction factor proportional to an amount of edge content in the image sensor data. The amount of edge content may be represented by the pixel-edge data generated in operation 406. In some embodiments, operation 410 may be performed by correction factor generator 112 (FIG. 1).

Operation 412 comprises generating video output data for some or all pixels by adding the pixel-averaged data generated in operation 402 to the pixel-edge data generated in operation 406 weighted by the correction factor generated in operation 410. In some embodiments, operation 412 may use the edge-magnitude information generated in operation 404. In some embodiments, operation 412 may be performed by video data generator 110 (FIG. 1).

Although the individual operations of procedure 400 are illustrated and described as separate operations, one or more of the individual operations may be performed concurrently, and nothing requires that the operations be performed in the order illustrated. For example, in some embodiments, operations 402, 404 and 406 may be performed concurrently.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may comprise volatile or non-volatile memory or a combination thereof.

Some embodiments of the invention may be implemented in hardware, firmware and/or software, as well as combinations thereof. Some embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others. That is, machine-readable medium may be tangible or intangible.

The Abstract is provided to comply with 37 C.F.R. Section 1.72(b) requiring an abstract that will allow the reader to ascertain the nature of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate embodiment.

What is claimed is:

1. An imaging system comprising:
 an edge-aware interpolator to perform an edge-aware demosaicing process on image sensor data to generate pixel-edge data;
 a difference data generator to generate difference data representing a difference between pixel-averaged data and the pixel-edge data; and
 a video data generator to generate video output data by adding the pixel-averaged data to the difference data weighted by a correction factor, wherein the correction factor is proportional to an amount of edge content in the image sensor data, wherein the image sensor data comprises Bayer data, wherein the video output data comprises red-green-blue intensity data, and wherein the difference data generator is configured to generate separate difference data comprising red difference data, green difference data, and blue difference data, wherein the video data generator is configured to use the separate difference data to generate the video output data when the correction factor is greater than a low threshold value and less than or equal to a high threshold value and wherein the video data generator is configured to use single-value difference data to generate the video output data when the correction factor is greater than the high threshold value.

2. A method comprising:
 generating video output data by adding pixel-averaged data to difference data weighted by a correction factor, the correction factor being proportional to an amount of edge content in image sensor data, wherein the image sensor data comprises Bayer data and wherein the difference data comprises separate red difference data, green difference data, and blue difference data;
 generating the separate red difference data, green difference data and blue difference data;
 using the separate difference data to generate the video output data when the correction factor is greater than zero and less than or equal to one; and
 using single-value difference data to generate the video output data when the correction factor is greater than one.

3. A wireless communication device comprising:
 an image sensor to generate image sensor data;
 image processing circuitry to generate video output data from the image sensor data; and
 a transceiver to transmit wireless communication signals including images represented by the video output data, wherein the imaging processing circuitry is configured to generate the video output data by adding pixel-averaged data to difference data weighted by a correction factor, the correction factor being proportional to an amount of edge content in the image sensor data, wherein the image sensor data comprises Bayer data, and wherein the difference data comprises separate red difference data, green difference data, and blue difference data;
 a difference data generator to generate the difference data representing a difference between the pixel-averaged data and the pixel-edge data, wherein the difference data generator is configured to generate the red difference data, green difference data and blue difference data; and
 a video data generator to generate the video output data by adding the pixel-averaged data to the difference data weighted by a correction factor, wherein the video data generator is configured to use the separate difference data to generate the video output data when the correction factor is greater than low threshold value and less than or equal to a high threshold value, and wherein the video data generator is configured to use single-value difference data to generate the video output data when the correction factor is greater than the high threshold value.

* * * * *